(12) United States Patent
Tanaka et al.

(10) Patent No.: US 9,346,482 B2
(45) Date of Patent: May 24, 2016

(54) STEERING-COLUMN DEVICE

(71) Applicants: JTEKT CORPORATION, Osaka-shi, Osaka (JP); TOYOTA JIDOSHA KABUSHIKI KAISHA, Toyota-shi, Aichi (JP)

(72) Inventors: Eiji Tanaka, Kitakatsuragi-gun (JP); Susumu Imagaki, Tondabayashi (JP); Takeshi Matsuda, Hamamatsu (JP); Hiroyuki Yao, Okazaki (JP); Shigeru Hoshino, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/759,312

(22) PCT Filed: Jan. 29, 2014

(86) PCT No.: PCT/JP2014/051923
§ 371 (c)(1),
(2) Date: Jul. 6, 2015

(87) PCT Pub. No.: WO2014/119607
PCT Pub. Date: Aug. 7, 2014

(65) Prior Publication Data
US 2015/0344064 A1 Dec. 3, 2015

(30) Foreign Application Priority Data
Jan. 30, 2013 (JP) .................. 2013-015795

(51) Int. Cl.
B62D 1/19 (2006.01)

(52) U.S. Cl.
CPC .................... B62D 1/195 (2013.01)

(58) Field of Classification Search
CPC ........................................ B62D 1/195
USPC ........................................ 280/777
See application file for complete search history.

(56) References Cited

U.S. PATENT DOCUMENTS 4,022,495 A 5/1977 Pizzocri et al.
4,786,076 A 11/1988 Wierschem
(Continued)

FOREIGN PATENT DOCUMENTS

EP 2700560 A1 2/2014
JP H08-72728 A 3/1996
(Continued)

OTHER PUBLICATIONS

Mar. 18, 2014 Search Report issued in international Patent Application No. PCT/JP2014/051923.
(Continued)

Primary Examiner — Faye M Fleming
(74) Attorney, Agent, or Firm — Oliff PLC

(57) ABSTRACT

A steering column device is provided with a suspension mechanism which is supported on a fixed bracket, suspends a movable jacket through a movable bracket, and can move in a column movement direction at the time of a secondary collision. The suspension mechanism includes a suspension bolt which is inserted into a first plate of the fixed bracket and a second plate of a tilt bracket and is screwed into a nut. A leaf spring which is interposed between a head portion of the suspension bolt and the second plate in a state of bringing a stepped portion of the suspension bolt into contact with the second plate biases the first plate to the second plate side. Further, the second plate is pinched between the stepped portion and the nut.

4 Claims, 9 Drawing Sheets

(56) References Cited

U.S. PATENT DOCUMENTS

| | | | |
|---|---|---|---|
| 4,943,028 A | 7/1990 | Hoffmann et al. | |
| 5,074,161 A | 12/1991 | Hancock | |
| 5,899,116 A | 5/1999 | Armstrong et al. | |
| 6,186,697 B1 | 2/2001 | Masuda et al. | |
| 7,651,132 B2 | 1/2010 | Cho et al. | |
| 9,010,806 B2 * | 4/2015 | Tanaka | B62D 1/195 280/777 |
| 9,016,722 B2 * | 4/2015 | Yachida | B62D 1/195 280/777 |
| 2003/0155760 A1 | 8/2003 | Laisement et al. | |
| 2004/0169364 A1 | 9/2004 | Hayashi et al. | |
| 2005/0200113 A1 | 9/2005 | Cymbal et al. | |
| 2008/0012281 A1 | 1/2008 | Cho et al. | |
| 2008/0236326 A1 * | 10/2008 | Matsui | F16F 7/123 74/493 |
| 2008/0284150 A1 | 11/2008 | Yamada | |
| 2009/0249916 A1 | 10/2009 | Ridgway et al. | |
| 2012/0112443 A1 | 5/2012 | Arakawa et al. | |
| 2012/0169035 A1 | 7/2012 | Minamigata et al. | |
| 2012/0187669 A1 | 7/2012 | Minamigata et al. | |
| 2012/0267884 A1 | 10/2012 | Fujiwara et al. | |
| 2012/0291585 A1 | 11/2012 | Minamigata et al. | |
| 2012/0299281 A1 * | 11/2012 | Fujiwara | B62D 1/195 280/777 |
| 2012/0318092 A1 | 12/2012 | Kuroumaru | |
| 2013/0133460 A1 * | 5/2013 | Uesaka | B62D 1/195 74/492 |
| 2013/0160592 A1 | 6/2013 | Shibazaki et al. | |
| 2014/0053677 A1 * | 2/2014 | Sakata | B62D 1/195 74/493 |
| 2014/0246848 A1 * | 9/2014 | Yachida | B62D 1/195 280/777 |
| 2015/0069746 A1 * | 3/2015 | Oishi | B62D 1/187 280/775 |
| 2015/0090066 A1 * | 4/2015 | Hoshino | B62D 1/195 74/492 |
| 2015/0314802 A1 * | 11/2015 | Tanaka | B62D 1/189 74/493 |

FOREIGN PATENT DOCUMENTS

| | | |
|---|---|---|
| JP | H08-301128 A | 11/1996 |
| JP | H10-258646 A | 9/1998 |
| JP | 2004-203141 A | 7/2004 |
| JP | 2005-219641 A | 8/2005 |
| JP | 2008-018920 A | 1/2008 |
| JP | 2008-308156 A | 12/2008 |
| JP | 2012-121538 A | 6/2012 |
| JP | 2012-131444 A | 7/2012 |
| JP | 2012-158290 A | 8/2012 |
| JP | 2012-240628 | 12/2012 |
| JP | 2014-166841 A | 9/2014 |
| WO | 2011/158787 A1 | 12/2011 |
| WO | 2014/119608 A1 | 8/2014 |

OTHER PUBLICATIONS

Jan. 6, 2015 Search Report issued in International Patent Application No. PCT/IB2014/001403.

Mar. 18, 2014 Search Report issued in International Patent Application No. PCT/JP2014/051924.

Mar. 18, 2014 Search Report issued in International Patent Application No. PCT/JP2014/052037.

U.S. Appl. No. 14/799,122.

U.S. Appl. No. 14/759,583.

Jan. 29, 2016 Extended European Search Report issued in European Patent Application No. 14746254.3.

Feb. 4, 2016 Search Report issued in European Patent Application No. 14745693.3.

Jan. 28, 2016 Extended European Search Report issued in European Patent Application No. 14746219.6.

Feb. 10, 2016 Notice of Allowance issued in U.S. Appl. No. 14/799,122.

* cited by examiner

STEERING-COLUMN DEVICE

TECHNICAL FIELD

The present invention relates to a steering column device.

BACKGROUND ART

In a steering column device, a primary collision in which a vehicle hits another vehicle is followed by a secondary collision in which a driver hits a steering wheel. In order to absorb impact at the time of the secondary collision, there are proposed various separation structures which separate a portion of a steering column from a vehicle body and move the steering column in the column shaft direction.

In PTL 1, there is proposed an assembly process of rigidly fastening a vehicle body-side bracket and a column-side bracket which are separated from each other at the time of the secondary collision, to each other by a bolt or a nut. In the assembly process, after the vehicle body-side bracket is temporarily assembled to a column bracket at a temporary assembly position shifted from a normal assembly position, a moving load when moving the vehicle body-side bracket with respect to the column-side bracket to the normal assembly position is measured, and both the brackets are fastened to each other at a target value of tightening torque determined by using the measured actual moving load.

CITATION LIST

Patent Literature

[PTL 1] JP 2012-131444 A

SUMMARY OF INVENTION

Technical Problem

However, in a case of rigidly tightening both the brackets, as in PTL 1, the target value of the tightening torque of the bolt significantly changes according to a friction state between both the brackets. Therefore, torque management is required individually for all products in order to accurately set a separation load, and thus the number of assembly steps increases.

Therefore, an object of the present invention is to provide a steering column device in which the number of assembly steps can be reduced by facilitating the management of the tightening torque of a suspension bolt and it is possible to suppress variation in a separation load.

Solution to Problem

In order to achieve the above object, according to an example of the present invention, there is provided a steering column device (1) including: a fixed bracket (23) which includes a first plate (30) fixed to a vehicle body-side member (13), wherein a first hole (31) being an elongated hole extending parallel to a column movement direction (X1) at the time of a secondary collision is formed in the first plate; a movable jacket (16) which rotatably supports a steering shaft (3) having a steering member (2) connected to one end of the steering shaft; a movable bracket (24) which supports the movable jacket so as to move in the column movement direction along with the movable jacket at the time of the secondary collision and includes a second plate (32) facing the first plate, wherein a second hole (33) facing the first hole is formed in the second plate; and a suspension mechanism (T1, T2) which is supported on the first plate, suspends the movable jacket through the movable bracket, and is configured to move in the column movement direction at the time of the secondary collision, wherein the suspension mechanism includes a suspension bolt (25) which is inserted into the first hole and the second hole, and a nut (34) which is screwed onto the suspension bolt and connects the first plate and the second plate in cooperation with the suspension bolt, the suspension bolt includes a head portion (52), a large-diameter portion (53) which is continuous to the head portion with a smaller diameter than the head portion and is inserted into the first hole, a small-diameter portion (54) which is continuous to the large-diameter portion with a smaller diameter than the large-diameter portion and is inserted into the second hole, a stepped portion (55) which is formed between the large-diameter portion and the small-diameter portion and comes into contact with the second plate, and a threaded portion (56) which is provided in the small-diameter portion and is screwed into the nut, the second plate is pinched between the nut and the stepped portion, and the suspension mechanism includes a leaf spring (42) which is interposed between the head portion and the first plate, thereby biasing the first plate to the second plate side.

In addition, the alphanumeric characters in parentheses represent corresponding constituent elements in embodiments which will be described later. However, of course, this does not mean that the present invention should be limited to these embodiments. The same applies to the following paragraphs.

Further, a pair of the first holes may be provided to be spaced apart in a direction orthogonal to the column movement direction, a pair of the second holes may be provided to be spaced apart in the direction orthogonal to the column movement direction, a pair of the suspension bolts may be provided and respectively inserted into a corresponding first hole and a corresponding second hole, and the leaf spring may be an annular disc spring which is provided in a pair, into each of which a corresponding suspension bolt is inserted.

Further, the suspension mechanism may be provided with an interposition plate (43) interposed between the leaf spring and the first plate, and at least one of the interposition plate and a sliding portion of the first plate facing the interposition plate may be configured with a low-friction material.

Further, the interposition plate may be a single elongated plate having a pair of suspension shaft insertion holes into which the pair of suspension bolts is respectively inserted, and extending in the direction orthogonal to the column movement direction, thereby receiving the disc springs as a pair of the leaf springs.

Advantageous Effects of Invention

According to the present invention, the leaf spring which is interposed between the head portion of the suspension bolt and the second plate in a state of bringing the stepped portion of the suspension bolt into contact with the second plate resiliently biases the first plate to the second plate side and the second plate is pinched between the stepped portion and the nut, whereby the first plate and the second plate are fastened to each other. That is, the tightening force of the suspension bolt which is a so-called tightening type does not affect the friction between the first plate and the second plate which relatively move at the time of the secondary collision, and therefore, the management of tightening torque is easy. The individual torque adjustment for all products, as in PTL 1, is also not required, and thus it is possible to reduce the number of assembly steps.

Further, the positional accuracy of the head portion and the stepped portion in a single member such as the suspension bolt is high, and the distance between the head portion and the second plate is regulated by the distance between the head portion and the stepped portion having high positional accuracy, and therefore, it is possible to accurately set the distance between the head portion and the second plate. Therefore, it is possible to accurately set the initial load of the leaf spring, and therefore, it is possible to suppress variation in separation load at the time of the secondary collision.

Further, even in a case where the pair of suspension bolts is provided, since the suspension bolt is a so-called tightening type, work such as alternately tightening up the pair of suspension bolts is not required, and thus it is possible to significantly reduce the number of assembly steps.

Further, at least one of sliding portions of the interposition plate interposed between the leaf spring and the first plate and the first plate is configured with a low-friction material, and therefore, at the time of the secondary collision, it is possible to smoothly move the pair of suspension bolts, the pair of disc springs, or the like in the column movement direction.

Further, the interposition plate is a single elongated plate extending in the direction orthogonal to the column movement direction and making the pair of suspension bolts be inserted thereinto, and therefore, at the time of the secondary collision, it is possible to straightly move the pair of suspension bolts or the like in the column movement direction without causing twisting.

DESCRIPTION OF EMBODIMENTS

Preferred embodiments of the present invention will be described with reference to the accompanying drawings.

Figure 1:
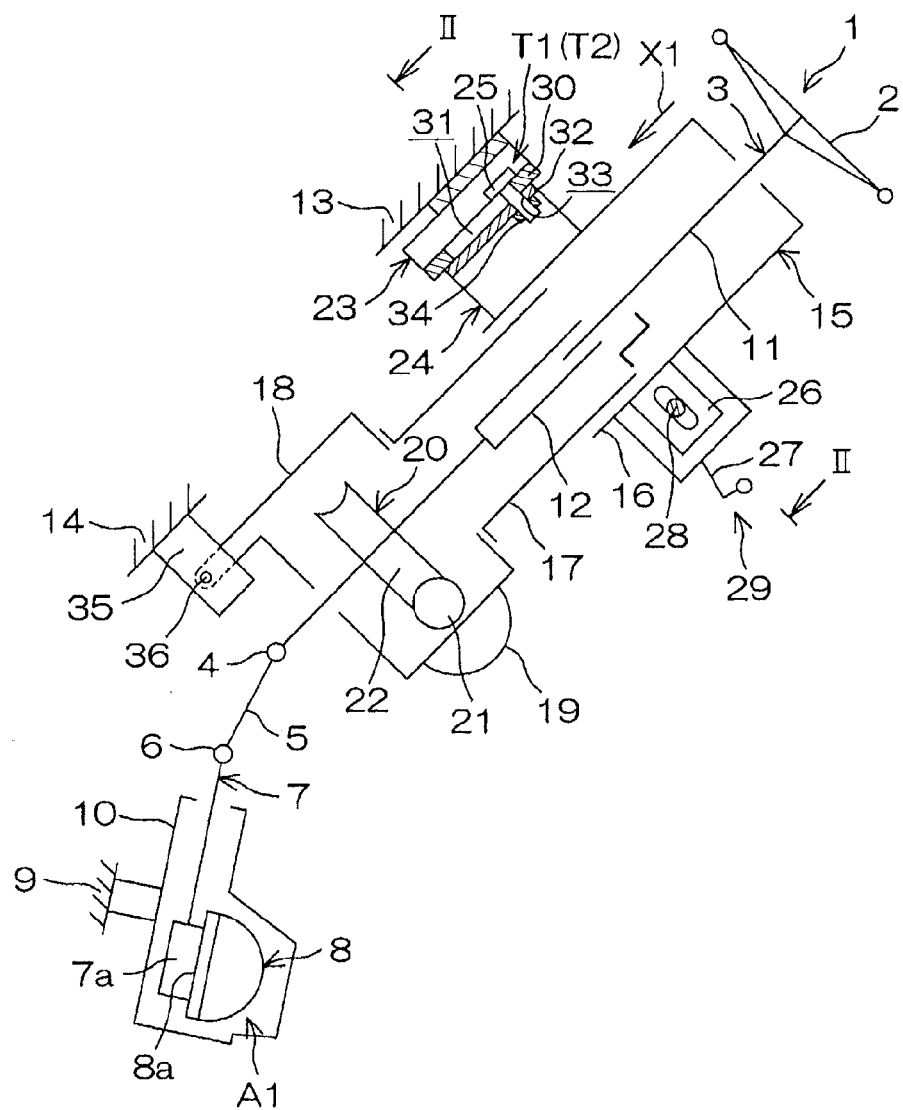
FIG. 1 is a schematic side view of a steering column device of an embodiment of the present invention and shows a schematic configuration of the steering column device.

FIG. 1 is a schematic diagram showing a schematic configuration of a steering column device of an embodiment of the present invention. Referring to FIG. 1, a steering column device 1 is provided with a steering shaft 3 connected to a steering member 2 such as a steering wheel, an intermediate shaft 5 connected to the steering shaft 3 through a universal joint 4, a pinion shaft 7 connected to the intermediate shaft 5 through a universal joint 6, and a rack shaft 8 as a steering shaft having a rack 8a which meshes with a pinion 7a provided in the vicinity of an end portion of the pinion shaft 7.

A steering mechanism A1 is configured with a rack-and-pinion mechanism which includes the pinion shaft 7 and the rack shaft 8. The rack shaft 8 is supported by a housing 10 fixed to a vehicle body-side member 9, so as to be able to move in a shaft direction (a direction orthogonal to the plane of the drawing) along a rightward-leftward direction of a vehicle. Although not shown in the drawings, each end portion of the rack shaft 8 is connected to a corresponding steering wheel through a corresponding tie rod and a corresponding knuckle arm.

The steering shaft 3 has an upper shaft 11 and a lower shaft 12 connected so as to be able to rotate together and to be able to relatively move in an axial direction, by using, for example, spline coupling. The steering shaft 3 is rotatably supported through a bearing (not shown) by a steering column 15 fixed to vehicle body-side members 13 and 14.

The steering column 15 is provided with a tubular upper jacket 16 (a movable jacket) fitted so as to be able to relatively move in the axial direction, a tubular lower jacket 17, and a housing 18 connected to a lower end in the axial direction of the lower jacket 17. A deceleration mechanism 20 which slows down the power of an electric motor 19 for steering assistance and transmits the reduced power to the lower shaft 12 is accommodated in the housing 18. The deceleration mechanism 20 has a drive gear 21 connected to a rotary shaft (not shown) of the electric motor 19 so as to be able to rotate together, and a driven gear 22 which meshes with the drive gear 21 and rotates together with the lower shaft 12.

In this embodiment, a description is made based on an example in which the steering column device 1 is applied to an electric power steering device. However, the present invention may be applied to a manual steering device. Further, in this embodiment, a description is made based on a case where the steering column device 1 is tilt-adjustable. However, the present invention may be applied to a steering column device which does not have a tilt adjustment function, and may also be applied to a tilt-adjustable and telescopic adjustable steering column device.

Figure 2:
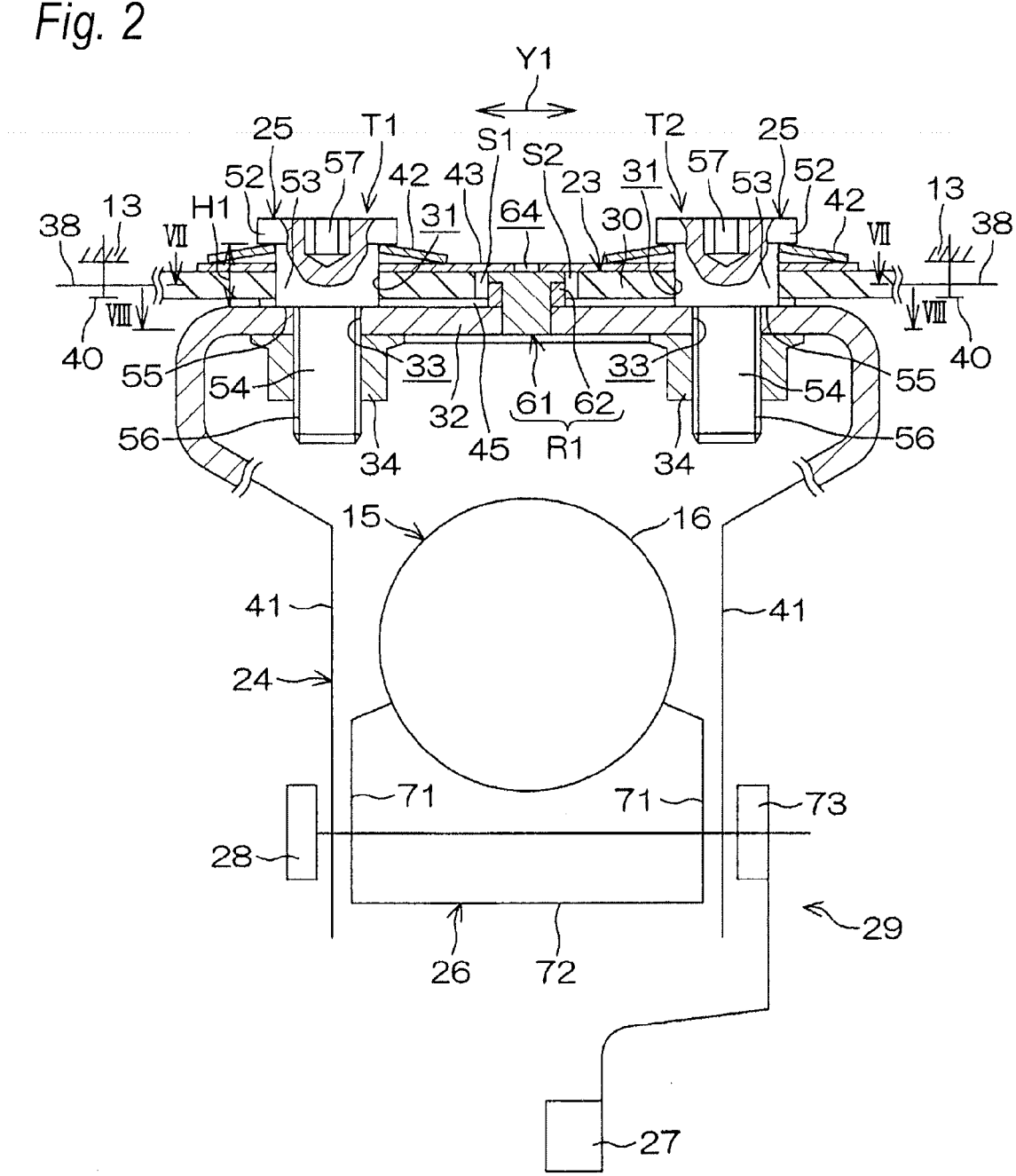
FIG. 2 is a schematic cross-sectional view of the steering column device of FIG. 1 and shows a cross section along line II-II of FIG. 1.

As shown in FIG. 2 which is a schematic cross-sectional view, the steering column device 1 is provided with a pair of suspension mechanisms T1 and T2 which is supported by a fixed bracket 23 and suspends the upper jacket 16 through a tilt bracket 24 as a movable bracket. The suspension mechanisms T1 and T2 move along with the tilt bracket 24 and the upper jacket 16 in a column movement direction X1 (refer to FIG. 1, and in FIG. 2, a direction orthogonal to the plane of the drawing) at the time of a secondary collision.

That is, as shown in FIGS. 1 and 2, the tilt bracket 24 as the movable bracket is suspended on the fixed bracket 23 fixed to the vehicle body-side member 13, through suspension bolts 25 as suspension shafts of the pair of suspension mechanisms T1 and T2. On the other hand, a column bracket 26 is fixed to the upper jacket 16 of the steering column 15.

As shown in FIGS. 1 and 2, the steering column device 1 is provided with a locking mechanism 29 which locks the position of the column bracket 26 after the tilt adjustment, through the tilt bracket 24 by a tightening shaft 28, or releases the locking, according to an operation of an operating lever 27. That is, the locking mechanism 29 locks the positions of the upper jacket 16 and the steering member 2 after the tilt adjustment or releases the locking.

Figure 3:
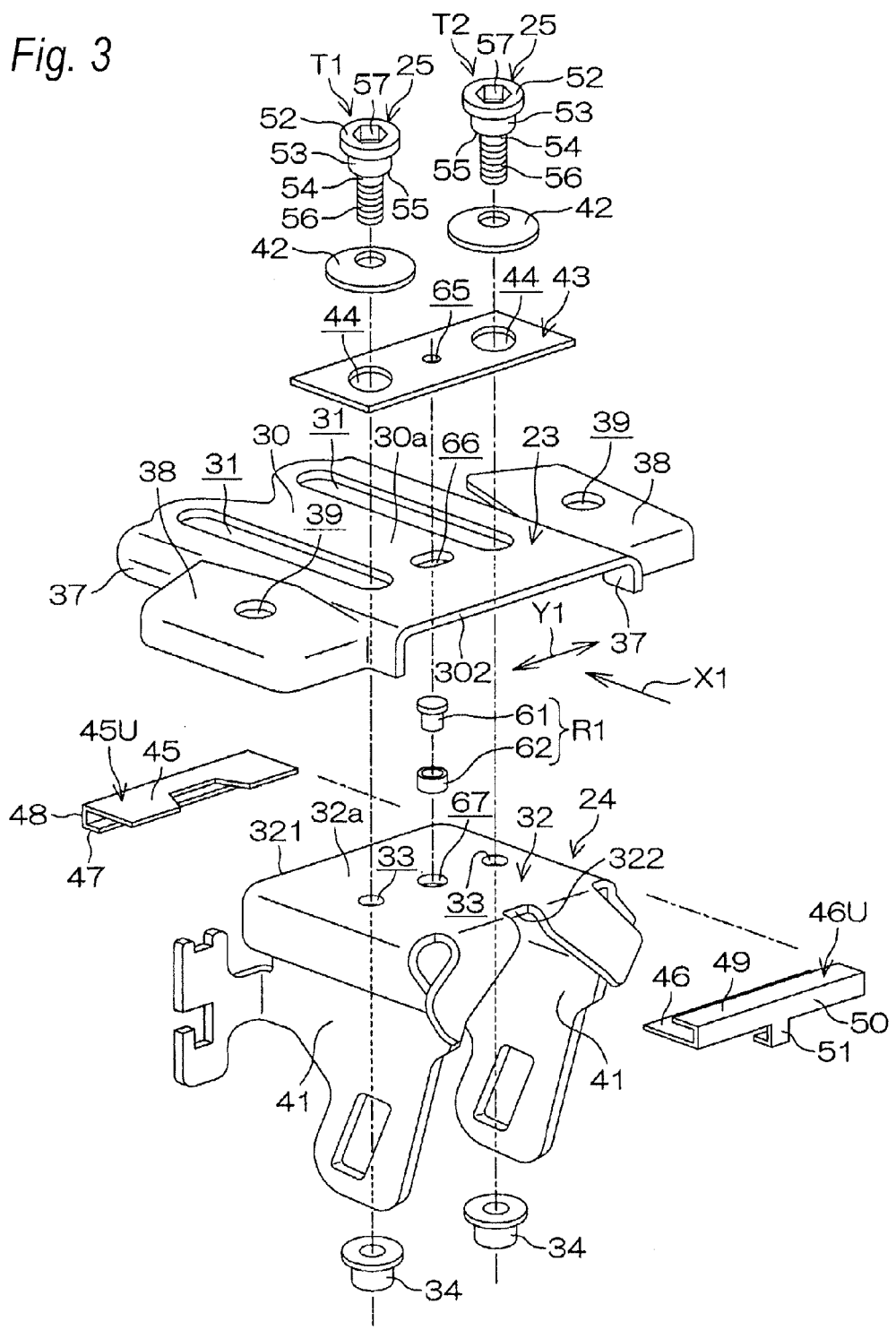
FIG. 3 is an exploded perspective view of the steering column device of FIG. 1.

As shown in FIGS. 2 and 3, the tilt bracket 24 is provided with a pair of side plates 41, and as shown in FIG. 2, the column bracket 26 has a groove shape provided with a pair of side plates 71 respectively facing the pair of side plates 41 of the tilt bracket 24, and a connection plate 72 connecting lower ends of the pair of side plates 71.

Referring to FIG. 2, the tightening shaft 28 is composed of a bolt which penetrates the side plates 41 and 71 of the tilt bracket 24 and the column bracket 26. By rotating a nut 73 which is screwed onto the tightening shaft 28 by a rotating operation of the operating lever 27, both the side plates 41 and 71 are tightened between a head portion of the bolt as the tightening shaft 28 and the nut 73, and thus both the side plates 41 and 71 are locked. In this way, the position of the steering member 2 after the tilt adjustment is locked, and thus tilt locking is achieved.

Figure 5:
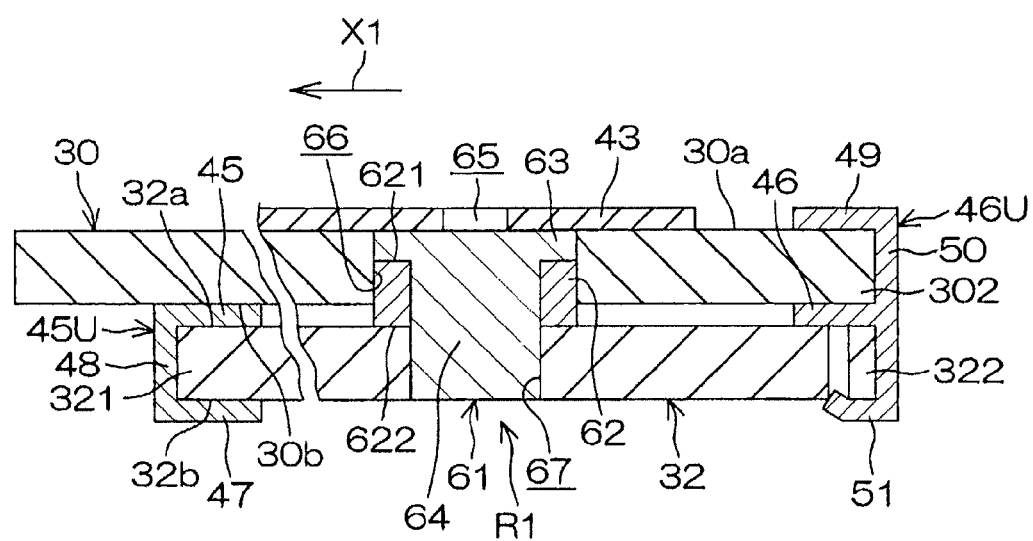
FIG. 5 is a cross-sectional view of a connection state of a first plate and a second plate and shows a cross section in a frontward-rearward direction which includes the axis of a resin pin.
Figure 6:
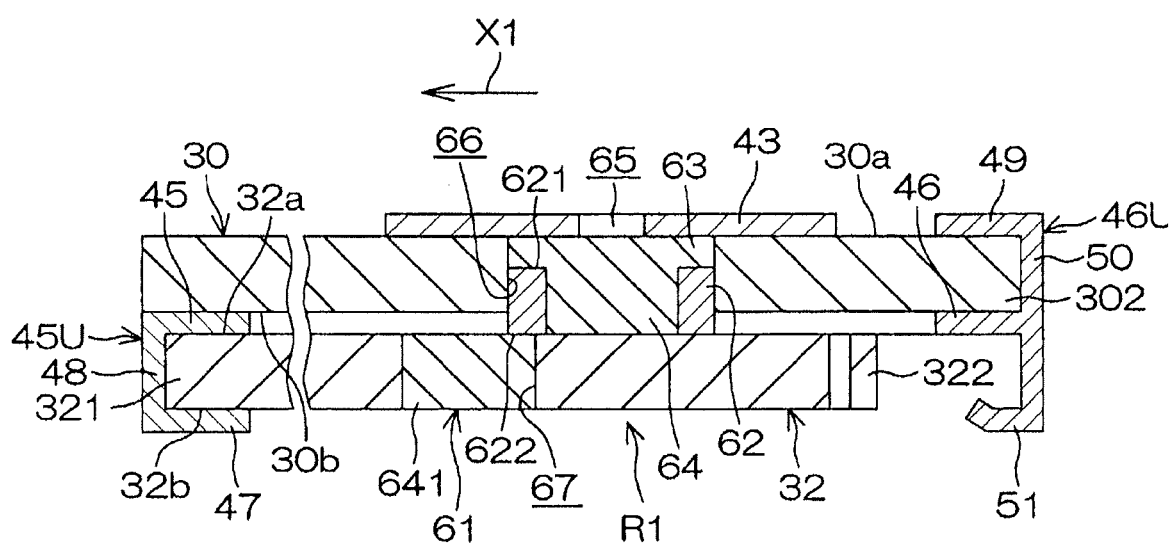
FIG. 6 is a cross-sectional view of the first plate and the second plate at the time of a secondary collision and shows a state where the second plate has been separated in a column movement direction from a predetermined position of the first plate due to shearing of the resin pin.

Further, the steering column device 1 is provided with a connection and separation mechanism R1 which connects a first plate 30 of the fixed bracket 23 and a second plate 32 of the tilt bracket 24 and separates, at the time of the secondary collision, the second plate 32 from a predetermined position (a position shown in FIG. 5) of the first plate 30 in the column movement direction X1, as shown in FIG. 6.

Figure 4:
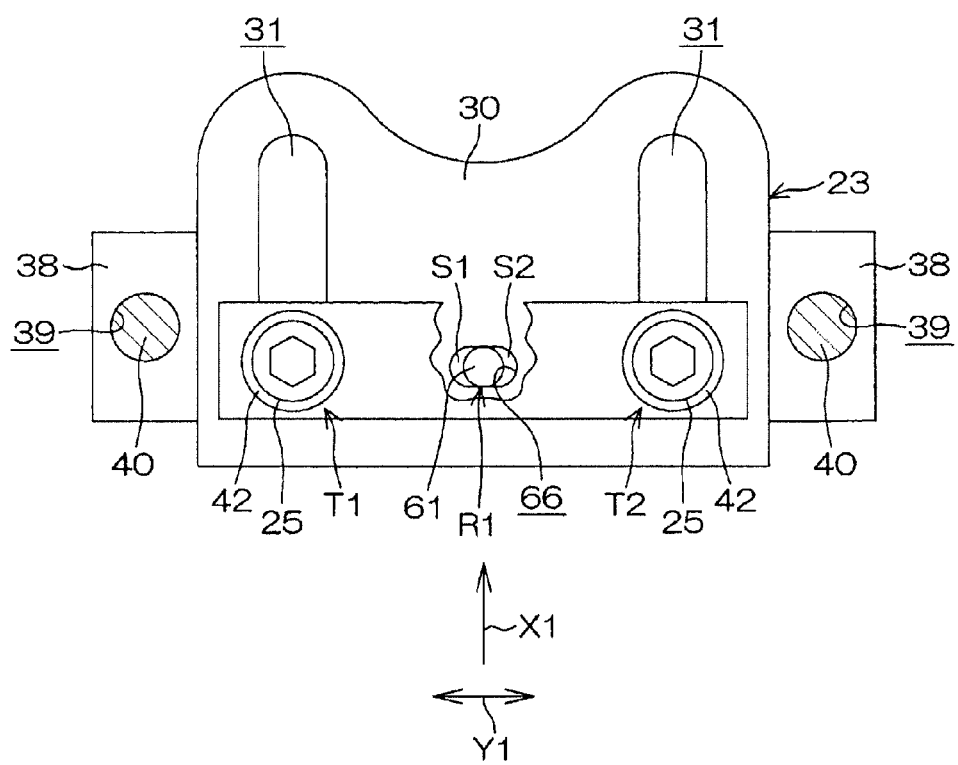
FIG. 4 is a partially cutaway schematic plan view of a fixed bracket, a pair of suspension mechanisms, and a connection and separation mechanism.

As shown in FIG. 2 and FIG. 4 which is a partially cutaway schematic plan view, the connection and separation mechanism R1 is disposed between the pair of suspension mechanisms T1 and T2 in relation to a direction Y1 orthogonal to the column movement direction X1. That is, the connection and separation mechanism R1 is disposed between a pair of first holes 31 (described later) of the first plate 30 of the fixed bracket 23 in relation to the direction Y1. Specifically, the connection and separation mechanism R1 is disposed at the middle position between the pair of first holes 31 (that is, between a pair of the suspension bolts 25) in relation to the direction Y1 orthogonal to the column movement direction X1.

Referring to FIG. 1, the fixed bracket 23 is provided with the first plate 30 parallel to the column movement direction X1 (equivalent to the axial direction of the steering shaft 3) at the time of the secondary collision. The first holes 31 for the suspension mechanisms T1 and T2, each of which is composed of an elongated hole extending parallel to the column movement direction X1, are formed in the first plate 30. On the other hand, the tilt bracket 24 (the movable bracket) is provided with the second plate 32 facing the first plate 30. Second holes 33 for the suspension mechanisms T1 and T2, each of which faces a portion of the first hole 31, are formed in the second plate 32.

The suspension bolt 25 is configured with a bolt which is inserted into the first hole 31 of the first plate 30 and the second hole 33 of the second plate 32 and screwed into a nut 34. The suspension bolt 25 which connects the first plate 30 and the second plate 32 in cooperation with the nut 34 suspends the upper jacket 16 (the movable jacket) through the tilt bracket 24 (the movable bracket) and the column bracket 26. Further, the suspension bolt 25 can move in the column movement direction X1 along the first hole 31 along with the tilt bracket 24 (the movable bracket), the column bracket 26, and the upper jacket 16 at the time of the secondary collision.

A lower bracket 35 fixed to the vehicle body-side member 14 supports a tilt center shaft 36 which is a pivot shaft. The tilt center shaft 36 supports the lower jacket 17 through the housing 18 of the steering column 15 so as to be able to swing around the tilt center shaft 36.

As shown in FIGS. 2 and 3, each of the suspension mechanisms T1 and T2 is configured with the suspension bolt 25, a disc spring 42 as a leaf spring, the nut 34, and the like. The connection and separation mechanism R1 is configured with a resin pin 61 which is shorn at the time of the secondary collision, and a cylindrical metal collar 62 fitted onto a portion in the axial direction of the resin pin 61.

Referring to FIG. 3, the fixed bracket 23 is provided with a pair of side plates 37 respectively provided to extend downward from a pair of side edges of the first plate 30, and a pair of mounting plates 38 respectively provided to extend toward the outside from the pair of side plates 37. The fixed bracket 23 is formed of, for example, sheet metal. Each of the mounting plates 38 is fixed to the vehicle body-side member 13 by a fixing bolt 40 (refer to FIG. 4) inserted into a threaded insertion hole 39 (refer to FIGS. 3 and 4) provided in each of the mounting plates 38. In this way, the fixed bracket 23 is fixed to the vehicle body-side member 13.

Referring to FIGS. 2 to 4, in the first plate 30 of the fixed bracket 23, the pair of first holes 31 is provided corresponding to the pair of suspension bolts 25. The pair of first holes 31 extends parallel to the column movement direction X1 at the time of the secondary collision and is spaced apart from each other in the direction Y1 orthogonal to the column movement direction X1.

As shown in FIGS. 2 and 3, the tilt bracket 24 (the movable bracket) is formed of, for example, sheet metal. The tilt bracket 24 is provided with the second plate 32 and the pair of side plates 41 provided to extend downward from a pair of side edges of the second plate 32 and has a groove shape. A connection portion between the second plate 32 and each of the side plates 41 may be formed in a curved shape, as shown in FIGS. 2 and 3.

In the second plate 32 of the tilt bracket 24, a pair of second holes 33 is provided corresponding to the pair of suspension bolts 25. Each of the suspension bolts 25 is sequentially inserted into the annular disc spring 42 as the leaf spring, a corresponding insertion hole 44 of a first interposition plate 43, a corresponding first hole 31 of the first plate 30, and a corresponding second hole 33 of the second plate 32 and is screwed into the nut 34. In this way, the suspension bolts 25 suspend the tilt bracket 24.

The first interposition plate 43 is composed of an elongated plate which extends in the direction Y1 orthogonal to the column movement direction X1, as shown in FIGS. 3 and 4, and is interposed between both the disc springs 42 and an upper surface 30a of the first plate 30, as shown in FIG. 2. The surface on at least the first plate 30 side of the first interposition plate 43 is configured with a low-friction material such as fluorine resin, for example. That is, the entirety of the first interposition plate 43 may be configured with a low-friction material, and the surface on the first plate 30 side of the first interposition plate 43 may be coated with a low-friction material.

A second interposition plate 45 and a third interposition plate 46 serving to reduce sliding resistance when the second plate 32 moves with respect to the first plate 30 in the column movement direction X1 at the time of the secondary collision are interposed between the first plate 30 and the second plate 32.

The second interposition plate 45 configures a groove-shaped unit 45U which is locked to a first end portion 321 which is an end portion on the column movement direction X1 side of the second plate 32. That is, the unit 45U is provided with the second interposition plate 45 along an upper surface 32*a* of the second plate 32 and a lower surface 30*b* of the first plate 30, a facing plate 47 facing the second interposition plate 45 and along a lower surface 32*b* of the second plate 32, and a connection plate 48 connecting the second interposition plate 45 and the facing plate 47 and coming into contact with an end edge on the column movement direction X1 side of the second plate 32.

The surface on at least the first plate 30 side of the second interposition plate 45 is configured with a low-friction material such as fluorine resin, for example. That is, the second interposition plate 45 or the unit 45U may be configured with a low-friction material, and the surface on the first plate 30 side of the second interposition plate 45 may be coated with a low-friction material.

The third interposition plate 46 configures a unit 46U which is locked to a second end portion 302 which is an end portion on the side opposite to the column movement direction X1 of the first plate 30, and a second end portion 322 which is an end portion on the side opposite to the column movement direction X1 of the second plate 32. That is, the unit 46U is provided with the third interposition plate 46 along the upper surface 32*a* of the second plate 32 and the lower surface 30*b* of the first plate 30, and a facing plate 49 facing the third interposition plate 46 and along the upper surface 30*a* of the first plate 30. Further, the unit 46U is provided with a connection plate 50 connecting the third interposition plate 46 and the facing plate 49 and coming into contact with an end edge on the side opposite to column movement direction X1 of the first plate 30, and a locking portion 51 having, for example, unciform hook shape, which is hooked and locked to the second end portion 322 of the second plate 32.

The surface on at least the second plate 32 side of the third interposition plate 46 is configured with a low-friction material such as fluorine resin, for example. That is, the third interposition plate 46 or the unit 46U may be configured with a low-friction material, and the surface on the second plate 32 side of the third interposition plate 46 may be coated with a low-friction material.

As shown in FIGS. 2 and 3, each of the suspension bolts 25 is provided with a head portion 52, a large-diameter portion 53 which is continuous to the head portion 52 and has a smaller diameter than the head portion 52, a small-diameter portion 54 which is continuous to the large-diameter portion 53 and has a smaller diameter than the large-diameter portion 53, a stepped portion 55 formed between the large-diameter portion 53 and the small-diameter portion 54, and a threaded portion 56 provided in the small-diameter portion 54. A tool engagement portion 57 having, for example, a hexagonal hole shape is provided in the head portion 52.

As shown in FIG. 2, the large-diameter portion 53 is inserted into the annular disc spring 42, the insertion hole 44 of the first interposition plate 43, and the first hole 31 of the first plate 30. The stepped portion 55 comes into contact with the upper surface 32*a* of the second plate 32 and is received by the upper surface 32*a*. The second plate 32 is pinched between the stepped portion 55 and the nut 34, and thus the suspension bolt 25 and the second plate 32 are fixed to each other.

A distance H1 (equivalent to the shaft length of the large-diameter portion 53) between the head portion 52 and the stepped portion 55 is made to be larger than the sum of the plate thickness of the second interposition plate 45 (or the plate thickness of the third interposition plate 46) which is interposed between the first plate 30 and the second plate 32, the plate thickness of the first plate 30, the plate thickness of the first interposition plate 43 along the upper surface 30*a* of the first plate 30, and the plate thickness of the disc spring 42 at the time of maximum compression. In this way, the disc spring 42 resiliently biases the first plate 30 to the second plate 32 side through the first interposition plate 43.

The resin pin 61 of the connection and separation mechanism R1 is provided with a head portion 63 having, for example, a circular cross section, and a columnar shaft portion 64 having a smaller diameter than the head portion 63. The cylindrical metal collar 62 is fitted onto the outer periphery of the shaft portion 64. The outer diameter of the metal collar 62 is made to be equal to the outer diameter of the head portion 63 of the resin pin 61. A first end portion 621 in the axial direction of the metal collar 62 comes into contact with the head portion 63 of the resin pin 61, and a second end portion 622 in the axial direction of the metal collar 62 is received by the upper surface 32*a* of the second plate 32. In this way, the resin pin 61 and the metal collar 62 are prevented from dropping to the lower side of the second plate 32.

On the other hand, the first interposition plate 43 is disposed so as to cover the upper side of the head portion 63 of the resin pin 61, whereby the dropout of the resin pin 61 to the upper side is prevented. Further, in the first interposition plate 43, a peep hole 65 which is smaller than the outer diameter of the head portion 63 is formed to face the head portion 63 of the resin pin 61. After the assembly of the connection and separation mechanism R1, by viewing the head portion 63 of the resin pin 61 through the peep hole 65 of the first interposition plate 43, it is possible to easily determine a work defect such as forgetting the assembly of the resin pin 61.

The head portion 63 of the resin pin 61 and most of the metal collar 62 are inserted into a first hole 66 for the connection and separation mechanism R1, of the first plate 30 of the fixed bracket 23. A portion of the metal collar 62 protrudes from the first hole 66. The portion protruding from the metal collar 62, of the shaft portion 64 of the resin pin 61, is inserted into a second hole 67 for the connection and separation mechanism R1, of the second plate 32 of the tilt bracket 24 (the movable bracket).

Figure 7:
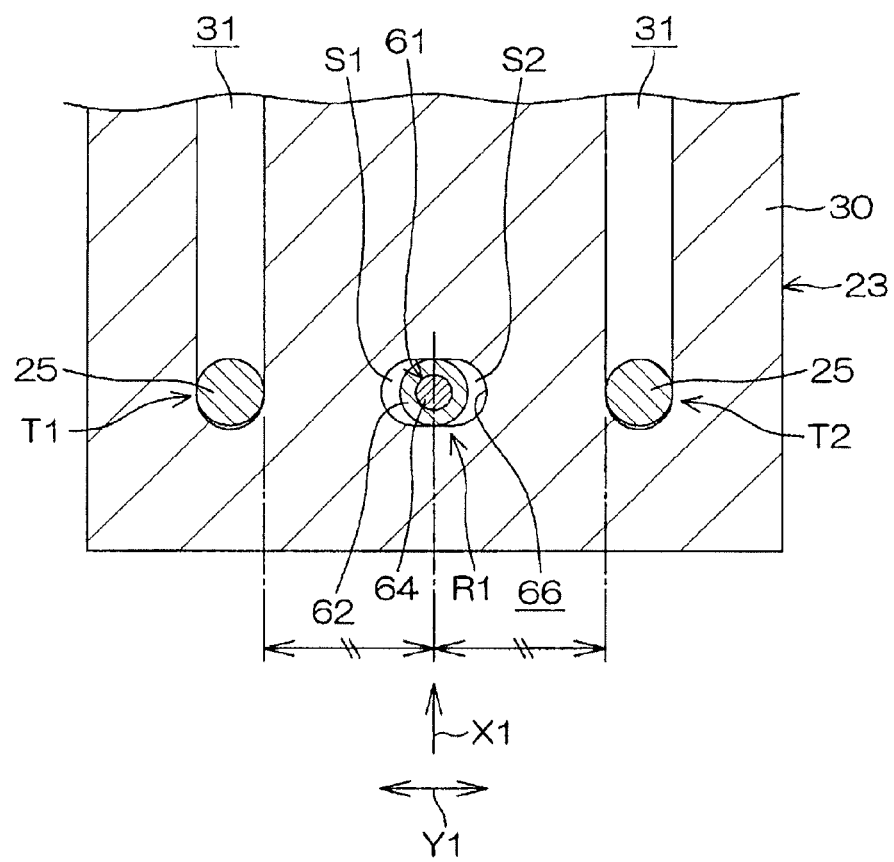
FIG. 7 is a cross-sectional view along line VII-VII of FIG. 2 and shows the cross sections of the first plate and the connection and separation mechanism.

As shown in FIG. 7 which is a cross section along line VII-VII of FIG. 2, the first hole 66 for the connection and separation mechanism R1 of the first plate 30 is disposed at the middle position between the first holes 31 for the suspension mechanisms T1 and T2 in relation to the direction Y1 orthogonal to the column movement direction X1. That is, the resin pin 61 is disposed at the middle position between the pair of suspension bolts 25 in relation to the direction Y1 orthogonal to the column movement direction X1.

Further, the first hole 66 for the connection and separation mechanism R1 of the first plate 30 is formed as a laterally elongated hole which is elongated in the direction Y1 orthogonal to the column movement direction X1. In this way, gaps S1 and S2 are provided between the outer periphery of the metal collar 62 and the inner periphery of the first hole 66 in relation to the direction Y1 orthogonal to the column movement direction X1.

Since the gaps S1 and S2 are present, even if a slight position shift occurs in the first plate 30 and the second plate 32 in the direction Y1 orthogonal to the column movement direction X1 due to some external force during transportation or during assembly, the resin pin 61 is not shorn.

Figure 8:
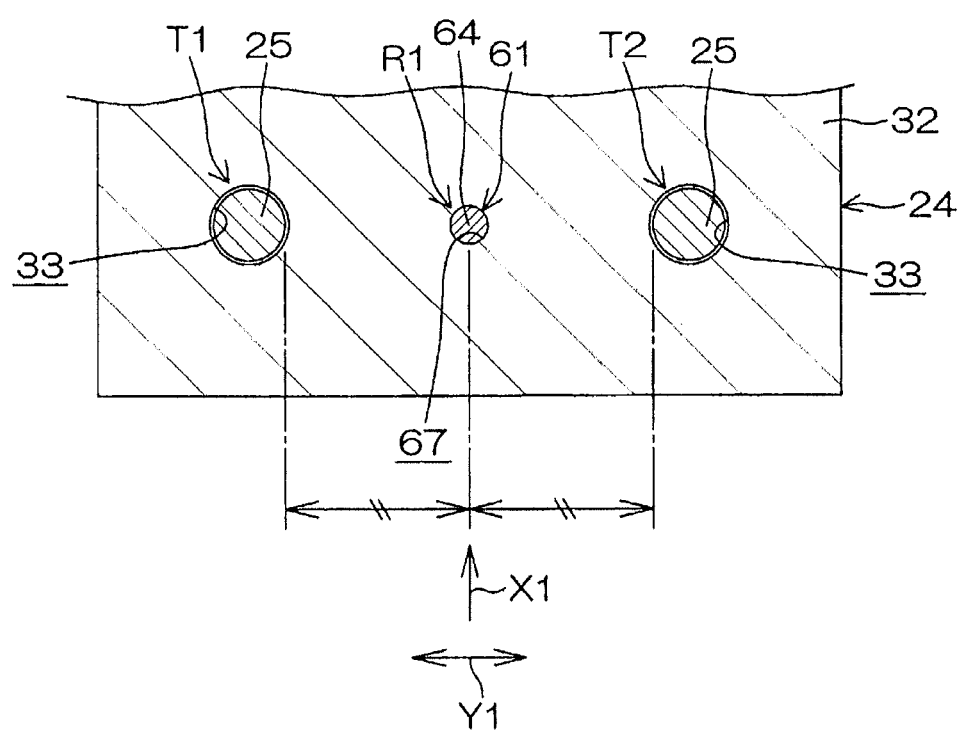
FIG. 8 is a cross-sectional view along line VIII-VIII of FIG. 2 and shows the cross sections of the second plate and the connection and separation mechanism.

As shown in FIG. 8 which is a cross section along line VIII-VIII of FIG. 2, the second hole 67 for the connection and separation mechanism R1, of the second plate 32 of the tilt bracket 24, is disposed at the middle position between the pair of second holes 33 for the suspension mechanisms T1 and T2 in relation to the direction Y1 orthogonal to the column movement direction X1. The second hole 67 is formed as a circular hole having an inner diameter which is equal to or slightly larger than the outer diameter of the shaft portion 64 of the resin pin 61.

At the time of the secondary collision, the shaft portion 64 of the resin pin 61 is shorn by the shift of the mating faces of the second end portion 622 of the metal collar 62 and the second plate 32. A shearing blade which is configured with an inner peripheral edge of the second end portion 622 of the metal collar 62 has an arc shape, and a shearing blade which is configured by an edge portion of the second hole 67 of the second plate 32 also has an arc shape.

According to this embodiment, as shown in FIG. 2, the disc spring 42 as the leaf spring which is interposed between the head portion 52 of the suspension bolt 25 and the second plate 32 in a state of bringing the stepped portion 55 of the suspension bolt 25 into contact with the second plate 32 resiliently biases the first plate 30 to the second plate 32 side and the second plate 32 is pinched between the stepped portion 55 and the nut 34, whereby the first plate 30 and the second plate 32 are fastened to each other. That is, the tightening force of the suspension bolt 25 which is a so-called tightening type does not affect the friction between the first plate 30 and the second plate 32 which relatively move at the time of the secondary collision, and therefore, the management of tightening torque is easy. The individual torque adjustment for all products, as in PTL 1, is also not required, and thus it is possible to reduce the number of assembly steps.

Further, the positional accuracy of the head portion 52 and the stepped portion 55 in a single member such as the suspension bolt 25 is high, and the distance between the head portion 52 and the second plate 32 is regulated by the distance H1 between the head portion 52 and the stepped portion 55 having high positional accuracy, and therefore, it is possible to accurately set the distance between the head portion 52 and the second plate 32. Therefore, it is possible to accurately set the initial load of the disc spring 42, and therefore, it is possible to suppress variation in separation load at the time of the secondary collision.

Further, even in a case where the pair of suspension bolts 25 is provided as in this embodiment, since the suspension bolt 25 is a so-called tightening type, work such as alternately tightening up the pair of suspension bolts 25 is not required, and thus it is possible to significantly reduce the number of assembly steps. Further, work to weld the nut 34 to the second plate 32 or to caulk the nut 34 to the second plate 32 or the suspension bolt 25 is not required, and thus also in this regard, it is possible to reduce the number of assembly steps.

Further, at least one of sliding portions of the first interposition plate 43 interposed between the disc spring 42 and the first plate 30 and the first plate 30 is configured with a low-friction material, and therefore, at the time of the secondary collision, it is possible to smoothly move the pair of suspension bolts 25, a pair of the disc springs 42, or the like in the column movement direction X1.

Further, the first interposition plate 43 is a single elongated plate extending in the direction Y1 orthogonal to the column movement direction X1 and making the pair of suspension bolts 25 be inserted thereinto, and therefore, at the time of the secondary collision, it is possible to straightly move the pair of suspension bolts 25 or the like in the column movement direction X1 without causing twisting.

Further, the second interposition plate 45 which moves together with the second plate 32 at the time of the secondary collision is interposed between the first plate 30 and the second plate 32, and the surface on at least the first plate 30 side of the second interposition plate 45 is configured with a low-friction material. Further, the third interposition plate 46 which is held by the first plate 30 and relatively moves with respect to the upper surface 32a of the second plate 32 at the time of the secondary collision is interposed between the first plate 30 and the second plate 32, and the surface on at least the second plate 32 side of the third interposition plate 46 slidable with respect to the second plate 32 is configured with a low-friction material.

With the action of the first interposition plate 43, the second interposition plate 45, and the third interposition plate 46, it is possible to more smoothly relatively move the first plate 30 and the second plate 32 at the time of the secondary collision. Therefore, it is possible to more reliably suppress the occurrence of twisting.

The connection and separation mechanism R1 which separates the second plate 32 of the tilt bracket 24 (the movable bracket) in the column movement direction X1 from a predetermined position (refer to FIG. 5) of the first plate 30 of the fixed bracket 23 at the time of the secondary collision is provided only between the first holes 31 composed of a pair of elongated holes in relation to the direction Y1 orthogonal to the column movement direction X1, and therefore, the occurrence of twisting of the tilt bracket 24 with respect to the fixed bracket 23 at the time of the secondary collision is suppressed, and thus it is possible to straightly move the tilt bracket 24 in the column movement direction X1.

Further, at the time of the secondary collision, the resin pin 61 provided as one pin between the pair of first holes 31 in relation to the direction Y1 orthogonal to the column movement direction X1 is shorn, thereby separating the second plate 32 of the tilt bracket 24 from the predetermined position of the first plate 30 of the fixed bracket 23. At the time of the secondary collision, the occurrence of imbalance of moment around the resin pin 61 can be suppressed, whereby the occurrence of twisting of both the brackets 23 and 24 is suppressed, and thus it is possible to straightly move the tilt bracket 24 in the column movement direction X1.

In particular, the connection and separation mechanism R1 is disposed at the middle position between the pair of first holes 31 in relation to the direction Y1 orthogonal to the column movement direction X1, and therefore, at the time of the secondary collision, the occurrence of twisting is reliably suppressed, and thus it is possible to reliably straightly move the tilt bracket 24 in the column movement direction X1.

Further, the resin pin 61 of the connection and separation mechanism R1, which is shorn such that a portion 641 of the shaft portion 64 is separated from the rest of the shaft portion according to the relative movement of the first plate 30 and the second plate 32, as shown in FIGS. 5 and 6, at the time of the secondary collision, is inserted into the first hole 66 of the first plate 30 and the second hole 67 of the second plate 32. As shown in FIG. 7, the first hole 66 and the resin pin 61 can relatively move by a predetermined amount in relation to the direction Y1 orthogonal to the column movement direction X1. Specifically, the gaps S1 and S2 are provided between the outer periphery of the metal collar 62 fitted onto the outer periphery of the resin pin 61 and the inner periphery of the first hole 66 in relation to the direction Y1 orthogonal to the column movement direction X1. Therefore, when transporting the steering column device 1 before assembly to a vehicle or when assembling the steering column device 1 to a vehicle, even if impact in a lateral direction is applied by some external force, the resin pin 61 is not shorn.

Further, as shown in FIG. 8, the second hole 67 into which the resin pin 61 is inserted has a cross-sectional shape of an arc shape at an area on the side opposite to the column movement direction X1 (specifically, the entire cross section of the second hole 67 has a circular shape). Therefore, at the time of the secondary collision, the resin pin 61 is smoothly shorn without falling (so-called, falling down) in the column movement direction X1. Therefore, it is possible to obtain a stable impact absorption load.

Further, as shown in FIG. 5, the resin pin 61 includes a columnar portion (equivalent to the shaft portion 64) having a straight cross-sectional shape, which extends over the first hole 66 and the second hole 67, and therefore, the shearing area of the resin pin 61 becomes constant, and thus it is possible to obtain a stable impact absorption load.

Further, as shown in FIG. 5, the metal collar 62, the inner periphery of which has a circular cross section, is fitted onto the outer periphery of the columnar portion (the shaft portion 64) of the resin pin 61, the metal collar 62 is inserted into the first hole 66 of the first plate 30, and the second end portion 622 of the metal collar 62 is received by the peripheral edge of the second hole 67 on the upper surface 32a of the second plate 32. Therefore, it is possible to eliminate most of the gap in relation to the axial direction of the resin pin 61 between a pair of sites (the inner periphery of the second end portion 622 of the metal collar 62 and the peripheral edge of the upper end of the second hole 67) functioning as a pair of shearing blades which shear the resin pin 61 at the time of the secondary collision. Therefore, it is possible to stabilize a shear load of the resin pin 61 without exerting bending to the resin pin 61 at the time of shearing.

Figure 9:
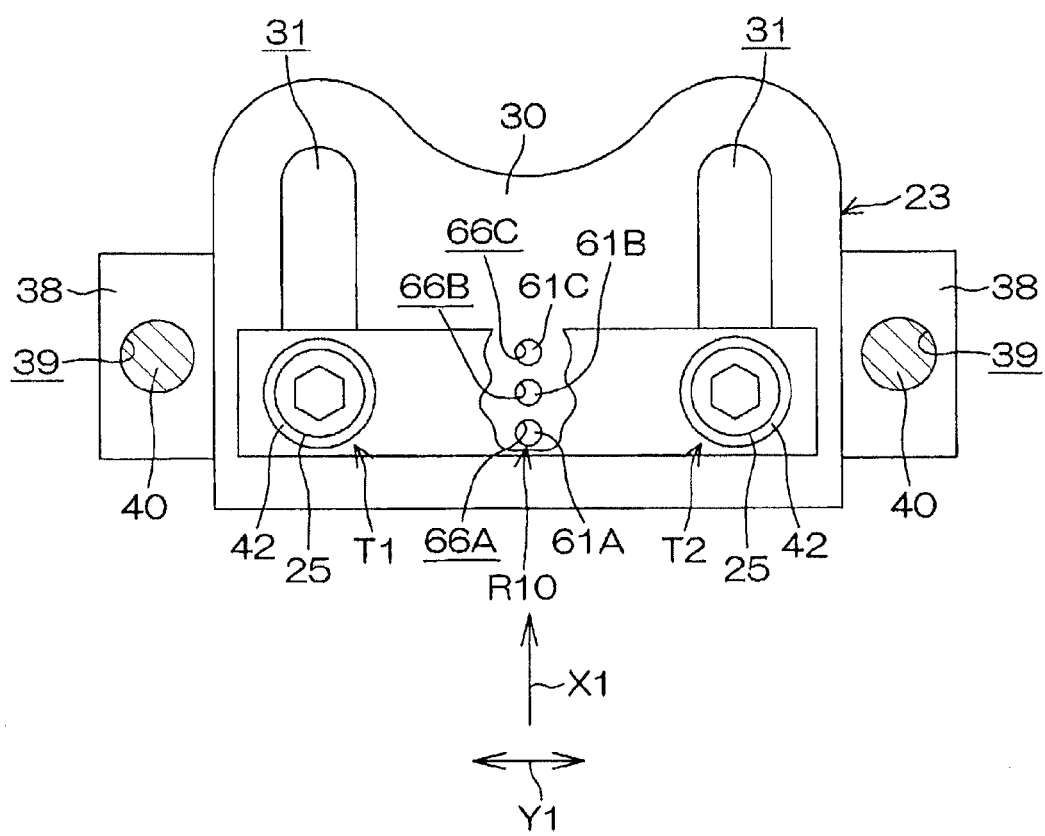
FIG. 9 is a partially cutaway schematic plan view of a fixed bracket, a pair of suspension mechanisms, and a connection and separation mechanism in another embodiment of the present invention.

The present invention is not limited to the above-described embodiment, and for example, instead of the connection and separation mechanism R1 in the embodiment of FIG. 4, as shown in an embodiment of FIG. 9, a connection and separation mechanism R10 which includes a plurality of resin pins 61A, 61B, and 61C provided in a single row lined up in the column movement direction X1 may be used. The respective resin pins 61A, 61B, and 61C are respectively inserted into corresponding first holes 66A, 66B, and 66C. The row of the resin pins 61A, 61 B, and 61C is disposed at the middle position between the pair of first holes 31 in relation to the direction Y1 orthogonal to the column movement direction X1.

Also in this embodiment, the same effect as that in the embodiment of FIG. 4 can be exhibited. Moreover, it is possible to easily set a separation load by the selection of the number of resin pins 61A, 61B, and 61C. In this embodiment, the same constituent elements as the constituent elements of the embodiment of FIG. 4 are denoted by the same reference numerals as the reference numerals of the constituent elements of the embodiment of FIG. 4.

In addition, various changes can be made within the scope stated in the claims of the present invention.

REFERENCE SIGNS LIST

1: steering column device
2: steering member
3: steering shaft
13: vehicle body-side member
15: steering column
16: upper jacket (movable jacket)
23: fixed bracket
24: tilt bracket (movable bracket)
25: suspension bolt
26: column bracket
27: operating lever
28: tightening shaft
29: locking mechanism
30: first plate
31: first hole (for suspension mechanism)
32: second plate
33: second hole (for suspension mechanism)
34: nut
42: disc spring (leaf spring)
43: first interposition plate
44: insertion hole
45: second interposition plate
45U: unit
46: third interposition plate
46U: unit
52: head portion
53: large-diameter portion
54: small-diameter portion
55: stepped portion
56: threaded portion
61; 61A, 61B, 61C: resin pin
62: metal collar
63: head portion
64: shaft portion
65: peep hole
66; 66A, 66B, 66C: first hole (for connection and separation mechanism)
67: second hole (for connection and separation mechanism)
R1; R10: connection and separation mechanism
T1, T2: suspension mechanism
X1: column movement direction
Y1: direction orthogonal to column movement direction The invetion claimed is:

1. A steering column device comprising:
a fixed bracket which includes a first plate fixed to a vehicle body-side member, wherein a first hole being an elongated hole extending parallel to a column movement direction at the time of a secondary collision is formed in the first plate;
a movable jacket which rotatably supports a steering shaft having a steering member connected to one end of the steering shaft;
a movable bracket which supports the movable jacket so as to move in the column movement direction along with the movable jacket at the time of the secondary collision and includes a second plate facing the first plate, wherein a second hole facing the first hole is formed in the second plate; and
a suspension mechanism which is supported on the first plate, suspends the movable jacket through the movable bracket, and is configured to move in the column movement direction at the time of the secondary collision, wherein the suspension mechanism includes a suspension bolt which is inserted into the first hole and the second hole, and a nut which is screwed onto the suspension bolt and connects the first plate and the second plate in cooperation with the suspension bolt,
the suspension bolt includes a head portion, a large-diameter portion which is continuous to the head portion with a smaller diameter than the head portion and is inserted into the first hole, a small-diameter portion which is continuous to the large-diameter portion with a smaller diameter than the large-diameter portion and is inserted into the second hole, a stepped portion which is formed between the large-diameter portion and the small-diameter portion and comes into contact with the second plate, and a threaded portion which is provided in the small-diameter portion and is screwed into the nut,
the second plate is pinched between the nut and the stepped portion, and the suspension mechanism includes a leaf spring which is interposed between the head portion and the first plate, thereby biasing the first plate to the second plate side.

2. The steering column device according to claim 1, wherein a pair of the first holes is provided to be spaced apart in a direction orthogonal to the column movement direction, a pair of the second holes is provided to be spaced apart in the direction orthogonal to the column movement direction, a pair of the suspension bolts is provided and respectively inserted into a corresponding first hole and a corresponding second hole, and the leaf spring is an annular disc spring which is provided in a pair, into each of which a corresponding suspension bolt is inserted.

3. The steering column device according to claim 2, wherein the suspension mechanism is provided with an interposition plate interposed between the leaf spring and the first plate, and at least one of the interposition plate and a sliding portion of the first plate facing the interposition plate is configured with a low-friction material.

4. The steering column device according to claim 3, wherein the interposition plate is a single elongated plate having a pair of suspension shaft insertion holes into which the pair of suspension bolts is respectively inserted, and extending in the direction orthogonal to the column movement direction, thereby receiving the disc springs as a pair of the leaf springs.

\* \* \* \* \*